(12) United States Patent
Liu et al.

(10) Patent No.: US 9,094,075 B2
(45) Date of Patent: Jul. 28, 2015

(54) METHODS AND APPARATUSES FOR GENERATING AND FEEDING BACK HIGH RANK ADAPTIVE CODEBOOK IN MULTIPLE INPUT MULTIPLE OUTPUT SYSTEM

(75) Inventors: Hao Liu, PuDong Jinqiao Shanghai (CN); Yang Song, PuDong Jinqiao Shanghai (CN); Di Lv, PuDong Jinqiao Shanghai (CN); Hongwei Yang, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/696,427

(22) PCT Filed: May 6, 2010

(86) PCT No.: PCT/CN2010/072501
§ 371 (c)(1),
(2), (4) Date: Nov. 6, 2012

(87) PCT Pub. No.: WO2011/137591
PCT Pub. Date: Nov. 10, 2011

(65) Prior Publication Data
US 2013/0051487 A1 Feb. 28, 2013

(51) Int. Cl.
*H04B 7/06* (2006.01)
*H04B 7/04* (2006.01)

(52) U.S. Cl.
CPC ............ *H04B 7/0639* (2013.01); *H04B 7/0482* (2013.01); *H04B 7/0486* (2013.01); *H04B 7/0469* (2013.01)

(58) Field of Classification Search
CPC .. H04B 7/0639; H04B 7/0417; H04B 7/0469; H04B 7/0482; H04B 7/0486; H04B 7/0626; H04B 7/0632; H04B 7/065; H04L 1/0001; H04L 1/0009; H04L 1/0019; H04L 1/0026; H04L 2025/03426; H04L 2025/03605
See application file for complete search history.

(56) References Cited

U.S. PATENT DOCUMENTS 8,385,433 B2 2/2013 Wang et al.
8,483,306 B2 * 7/2013 Chen et al. .................... 375/267
(Continued)

FOREIGN PATENT DOCUMENTS

CN 101330479 A 12/2008
CN 101346899 A 1/2009
(Continued)

OTHER PUBLICATIONS

International Search Report for PCT/CN2010/072501 dated Feb. 17, 2011.

*Primary Examiner* — Hirdepal Singh
(74) *Attorney, Agent, or Firm* — Fay Sharpe LLP

(57) ABSTRACT

A method and device for generating and feeding back high rank adaptive codebook in multiple input multiple output system are disclosed in the embodiments of the invention. The method for generating high rank adaptive codebook includes: using different levels of a long time channel correlation matrix to transform different row vectors in high rank basic codebook, so as to aim at the directions of different eigenvectors of the long time channel correlation matrix; and using the transformed row vectors to construct the high rank adaptive codebook. The method of the invention has well system performance gain and no any additional feedback cost.

15 Claims, 6 Drawing Sheets

(56) References Cited

U.S. PATENT DOCUMENTS

| | | |
|---|---|---|
| 8,649,456 B2 | 2/2014 | Xia et al. |
| 8,675,627 B2 | 3/2014 | Xia et al. |
| 2007/0174038 A1 | 7/2007 | Wang et al. |
| 2010/0034308 A1 | 2/2010 | Kim et al. |
| 2010/0238913 A1* | 9/2010 | Xia et al. ................ 370/342 |
| 2011/0080964 A1* | 4/2011 | Shamsi et al. ............ 375/260 |
| 2011/0103493 A1* | 5/2011 | Xia et al. ................ 375/259 |
| 2012/0087422 A1* | 4/2012 | Zhou et al. .............. 375/259 |
| 2012/0134434 A1* | 5/2012 | Chen et al. .............. 375/267 |
| 2012/0140834 A1* | 6/2012 | Choi et al. ............... 375/260 |
| 2012/0300868 A1* | 11/2012 | Chen et al. .............. 375/267 |
| 2013/0028344 A1* | 1/2013 | Chen et al. .............. 375/267 |
| 2013/0223245 A1 | 8/2013 | Taoka et al. |

FOREIGN PATENT DOCUMENTS

| | | |
|---|---|---|
| CN | 101540663 A | 9/2009 |
| CN | 101635612 A | 1/2010 |
| JP | 2009-514383 A | 4/2009 |
| JP | 2012-520040 A | 8/2012 |
| WO | WO 2007/050861 A2 | 5/2007 |
| WO | WO 2009/131376 A2 | 10/2009 |
| WO | WO 2010/102583 A1 | 9/2010 |

\* cited by examiner

METHODS AND APPARATUSES FOR GENERATING AND FEEDING BACK HIGH RANK ADAPTIVE CODEBOOK IN MULTIPLE INPUT MULTIPLE OUTPUT SYSTEM

FIELD OF THE INVENTION

Embodiments of the present invention relate to a Multiple Input Multiple Output (MIMO) system in a wireless communication network, and more specifically to the generation and feedback of a high rank adaptive codebook in a MIMO system.

BACKGROUND OF THE INVENTION

Multi-antenna techniques, such as single-user MIMO (SU-MIMO) and multi-user MIMO (MU-MIMO), are identified as key techniques for Long-Term Evolution-Advanced LTE-A to satisfy the IMT-Advanced requirements. In a MEMO system, typically various transmitted data streams are processed by proper precoding, which can increase system performance. To implement precoding, it is required that a transmitting apparatus can obtain channel state information, which, in turn, requires user equipment to feed back the channel state information to a base station. Channel information feedback accuracy has bee proven to have great impact on system performance of multi-antenna schemes, especially MU-MIMO.

In fact, there are however quite scarce resources for channel state information feedback. With a limited feedback capacity, user equipment generally first quantizes channel state information in order to increase feedback accuracy. A common approach to quantization is implemented by a codebook. In this approach, a set of codebooks (also referred to as a codebook set) is prestored at a base station and user equipment, and a receiving apparatus selects a matching precoding matrix under some criterion according to a current channel state and then feeds back a Precoding Matrix Index (PMI) to a transmitting apparatus.

One normal codebook feedback scheme uses a fixed codebook. The larger the number of feedback bits is, the larger a codebook set can be supported. This scheme is characterized by simple implementation and low feedback overheads. However, in a fixed codebook scheme, a codebook's ability to adapt to scenarios and its system performance gains are rather limited. It is impossible to have a constant codebook optimized for all antenna configurations and application scenarios.

Another codebook feedback scheme uses an adaptive codebook, wherein long-term wideband spatial correlation matrix is used to aid channel information quantization and feedback. The adaptive codebook can adaptively change according to a long-term spatial correlation matrix of each user so as to better accommodate the channel information for different users. This scheme is also termed spatial correlation based adaptive codebook feedback, which has been widely supported by many companies in 3GPP LTE-A to improve channel feedback accuracy and enhance system performance for SU/MU-MIMO.

In current adaptive codebook schemes, the baseline codebook is transformed with a long-term spatial correlation matrix, the codebook is rotated, and the transformed codebook is aligned to the preferred beamforming direction, which is the dominant eigenvector of the long-term spatial correlation matrix. The obtained adaptive codebook can be selected from only a spherical cap rather than the whole hypersphere during channel quantization. Therefore, the adaptive codebook can naturally be used to quantize rank-one channel information or dominant eigenvector information.

The spatial correlation based adaptive feedback has really shown explicit system performance gains in rank-one transmission over normal codebook feedback without spatial correlation information. But in current adaptive codebook schemes, for high rank (higher than 1) channel feedback some lower level (level 1) of eigenvectors also needs to be quantized and fed back in addition to a dominant eigenvector. Since the adaptive codebook is not aligned to the direction of the lower level of eigenvectors, the current high rank adaptive codebook is not suitable for high rank transmission. In high rank transmission, current spatial correlation based adaptive codebook feedback cannot achieve significant system performance gains and even probably lower performance than normal codebook feedback without spatial correlation information. How to further improve high rank channel feedback quality makes critical challenge for feedback mechanism design.

SUMMARY OF THE INVENTION

The embodiments of the present invention propose an enhanced adaptive codebook generating and feedback mechanism to further improve high rank channel feedback quality and the corresponding system performance.

An embodiment of the present invention provides a method for generating a high rank adaptive codebook in a MIMO communication system, comprising:
transforming different column vectors in a high rank baseline codebook by different levels of a long-term channel correlation matrix to align to directions of different eigenvectors of the long-term channel correlation matrix; and
using the transformed column vectors to construct a high rank adaptive codebook.

Another embodiment of the present invention provides a method for feeding back channel information in a MIMO communication system, comprising:
transforming different column vectors in a high rank baseline codebook by different levels of a long-term channel correlation matrix to align to directions of different eigenvectors of the long-term channel correlation matrix, thereby constructing a high rank adaptive codebook;
constituting a high rank adaptive codebook set on the basis of all high rank adaptive codebooks;
determining from the high rank adaptive codebook set an index of a high rank adaptive codebook matching a current channel; and
feeding back information on the long-term channel correlation matrix and the index.

An embodiment of the present invention provides a method for processing channel information in a MIMO communication system, comprising:
receiving information on a long-term channel correlation matrix and an index of a high rank adaptive codebook;
transforming different column vectors of a high rank baseline codebook corresponding to the index by different levels of the long-term channel correlation matrix to align to directions of different eigenvectors of the long-term channel correlation matrix; and
using the transformed column vectors to construct a high rank adaptive codebook.

An embodiment of the present invention provides an apparatus for generating a high rank adaptive codebook in a MIMO communication system, comprising:
an aligning component configured for transforming different column vectors in a high rank baseline codebook by different levels of a long-term channel correlation matrix to align to directions of different eigenvectors of the long-term channel correlation matrix; and a constructing component configured for using the transformed column vectors to construct a high rank adaptive codebook.

An embodiment of the present invention provides an apparatus for feeding back channel information in a MIMO communication system, comprising:

a constructing component configured for transforming different column vectors in a high rank baseline codebook by different levels of a long-term channel correlation matrix to align to directions of different eigenvectors of the long-term channel correlation matrix, thereby constructing a high rank adaptive codebook;

a generating component configured for constituting a high rank adaptive codebook set on the basis of all high rank adaptive codebooks;

a determining component configured for determining from the high rank adaptive codebook set an index of a high rank adaptive codebook matching a current channel; and a feedback component configured for feeding back information on the long-term channel correlation matrix and the index.

An embodiment of the present invention provides an apparatus for processing channel information in a MIMO communication system, comprising:

a receiving component configured for receiving information on a long-term channel correlation matrix and an index of a high rank adaptive codebook;

a aligning component configured for transforming different column vectors of a high rank baseline codebook corresponding to the index by different levels of the long-term channel correlation matrix to align to directions of different eigenvectors of the long-term channel correlation matrix; and a constructing component configured for using the transformed column vectors to construct a high rank adaptive codebook.

BRIEF DESCRIPTION OF THE DRAWINGS

Other objects, features and advantages of the present invention will become clearer by making references to the following detailed description of nonrestrictive embodiments of the present invention in conjunction with the accompanying drawings, in which.

DETAILED DESCRIPTION OF EMBODIMENTS

Methods and apparatuses for high rank adaptive codebook generating and feedback in a MIMO system according to the embodiments of the present invention will be described below with reference to the concrete embodiments in conjunction with the accompanying drawings.

In the embodiments of the present invention there is proposed an enhanced adaptive codebook generating and feedback mechanism to further improve high rank channel feedback quality and the corresponding system performance. A high rank baseline codebook set is composed of multiple high rank baseline codebooks. Each high rank baseline codebook is composed of multiple column vectors. Each column vector can be used to quantize different eigenvectors of channels. In order to improve quantization accuracy, different column vectors in the high rank baseline codebook are transformed by different levels of a spatial correlation matrix to align to different beamforming of different levels of eigenvectors. All transformed column vectors constitute a new high rank adaptive codebook, which can more precisely depict high rank channel information. This kind of high rank adaptive codebook can be used for various antenna configurations and application scenarios. As an example, antenna deployment may be, e.g. co-polarized or cross-polarized. The transmitting antenna number may be e.g. 4Tx or 8Tx antennas. The embodiments of the present invention may apply to scenarios for transmitting any allowed number of streams (i.e., any transmission rank). Moreover, the embodiments of the present invention may apply to any multi-antenna scheme, e.g. SU-MIMO or MU-MIMO.

It should be noted that the rank in a MIMO system is defined as the number of independent equations corresponding to the MIMO system (algebraic rank). The magnitude of the rank limits the number of data streams that can be space-division multiplexed in the system. The rank is always less than or equal to both the number of Tx antennas and the number of Rx antennas. In the context of the present invention, unless otherwise specified explicitly, the term "rank" generally refers to the number of transmitted data streams, and the term "high rank" generally means that the number of transmitted data streams is more than 1. When the number of transmitted data streams is more than 1, a codebook used by the system has usually high rank.

In addition, it should be understood that that a codebook set comprises multiple codebooks, and a codebook comprises column vectors. Typically, the larger a codebook set (i.e., the more codebooks included), the higher quantization accuracy being achieved.

Concrete embodiments of the present invention are described below in detail in conjunction with the accompanying drawings.

Figure 1:
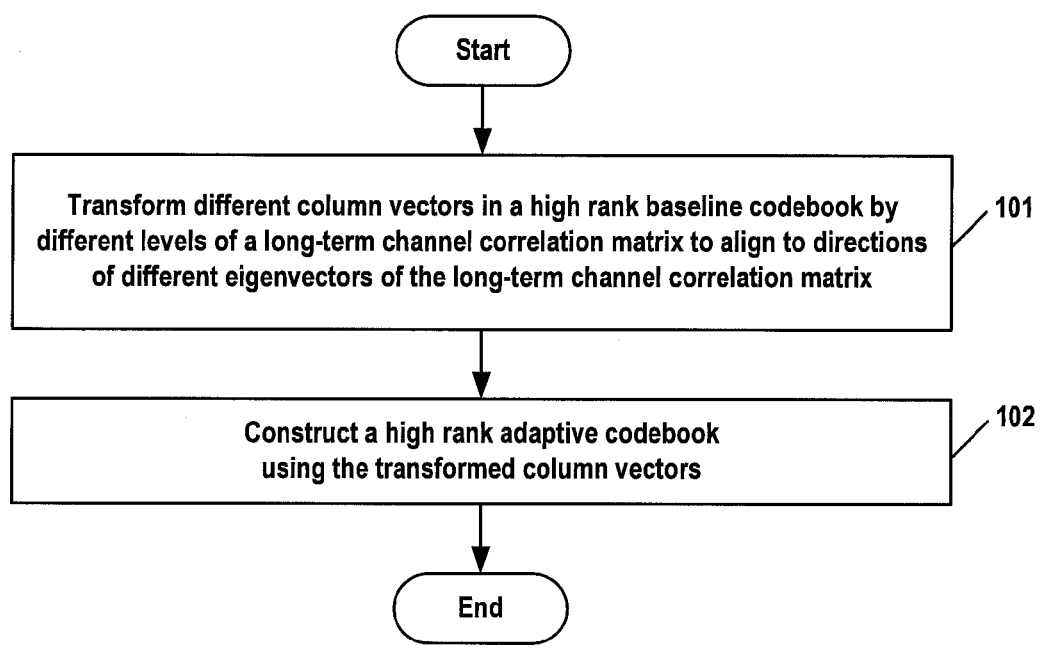
FIG. 1 shows a flowchart of a method for generating a high rank adaptive codebook in a MIMO communication system according to an embodiment of the present invention.

FIG. 1 shows a flowchart of a method for generating a high rank adaptive codebook in a MIMO communication system according to an embodiment of the present invention. As shown in FIG. 1, at step 101 different column vectors in a high rank baseline codebook are transformed by different levels of a long-term channel correlation matrix to align to directions of different eigenvectors of the long-term channel correlation matrix. At step 102 a high rank adaptive codebook is constructed using the transformed column vectors.

In the embodiment of the present invention, a baseline codebook set is prestored by a transmitting apparatus and a receiving apparatus. The baseline codebook set may be predetermined according to concrete antenna configurations and application scenarios. For example, the baseline codebook set may be predetermined by a base station offline and then transferred to user equipment.

The long-term channel correlation matrix may be generated according to a measured channel response or obtained by receiving from other apparatus. For example, the receiving apparatus may determine the long-term channel correlation matrix by measuring a reference signal (e.g., pilot signal) of transmission link. The transmitting apparatus may obtain information on the long-term channel correlation matrix by feedback from the receiving apparatus.

In the method according to the embodiment of the present invention, the channel correlation matrix is divided into levels according to its eigenvectors. If the number of Tx antennas is M, then the channel correlation matrix is an M×M matrix. If the channel correlation matrix has r eigenvalues and r corresponding eigenvectors, then a covariance matrix related to an eigenvector of the largest eigenvalue is allocated to the first level, a covariance matrix related to an eigenvector of the second largest eigenvalue is allocated to the second level, and so on and so forth, the channel correlation matrix is divided into M levels. Accordingly, these eigenvectors corresponding to different eigenvalues are termed different levels of eigenvectors.

According to an embodiment of the present invention, during transformation at step 101, the $l^{th}$ column vector of the high rank baseline codebook is transformed by the 1 to M levels of the long-term spatial correlation matrix, wherein $l \geq 1$, M is the number of Tx antennas, and M also corresponds to the largest number of levels of the long-term spatial correlation matrix.

In an example of this embodiment, the transmitting apparatus is, for example, a base station of a cell with M Tx antennas, the receiving apparatus is, for example, user equipment UE with N RX, the number of transmitted data streams is r, wherein r is less than M. Each UE may detect downlink (DL) channel according to DL reference signals, calculate a long-term wideband spatial correlation matrix averaged over multiple sub-bands and multiple subframes, and then quantize and feed back to its serving cell.

For example, a M×M quantized long-term spatial correlation matrix $\bar{R}_k$ of user equipment k may be represented as below through identical transformation:

$$\bar{R}_k = \sum_{i=1}^{M} \bar{R}_{ki} = \sum_{i=1}^{M} \bar{\lambda}_{ki} \bar{V}_{ki} \bar{V}_{ki}^H,$$

where:
$\bar{\lambda}_{ki}$ is the $i^{th}$ eigenvalue of $\bar{R}_k$, (i=1, ..., M), and $\bar{\lambda}_{k1} > \ldots > \bar{\lambda}_{kM}$;
$\bar{V}_{ki}$ is the $i^{th}$ eigenvector of $\bar{R}_k$, and
$\bar{R}_{ki}$ is the covariance matrix related to the $i^{th}$ eigenvector $\bar{V}_{ki}$.

The high rank baseline codebook used by the system may be denoted as below:

$$c_j = [c^1_j \ldots c^r_j] \in \{c_1, \ldots, c_S\}^{M \times r},$$

where:
S is the number of codebooks included in the baseline codebook set, i.e., the magnitude of the codebook set. S is usually equal to power of 2, for example, $S=2^B$. B usually indicates the number of bits needed for quantization and feedback of the quantization information;

$c_j$ is a codebook with M×r dimension;
$c^l_j$ is the $l^{th}$ column vector with M×1 dimension of high rank baseline codebook $c_j$, l=1, ..., r.

According to an embodiment of the present invention, each baseline codebook in the baseline codebook set is transformed according to a long-term spatial correlation matrix of each user, thereby obtaining a corresponding adaptive codebook. The corresponding adaptive codebooks constitute an adaptive codebook set. In order to align to beamforming directions corresponding to different levels of eigenvectors, the different column vectors in the baseline codebook should be rotated by different levels of the spatial correlation matrix.

According to an embodiment of the present invention, the first column $c^1_j$ of baseline codebook $c_j$ is transformed by the whole long-term spatial correlation $$\bar{R}_k = \sum_{i=1}^{M} \bar{R}_{ki}$$

to align to the dominant eigenvector direction, that is $$\text{normalize}\left(\sum_{i=1}^{M} \bar{R}_{ki} c^1_j\right)$$

where normalize (•) is the operation of normalization.

Except the first column $c^1_j$, all column vectors are transformed not by the whole long-term spatial correlation $$\bar{R}_k = \sum_{i=1}^{M} \bar{R}_{ki}$$

but by only part thereof. For example, the $l^{th}$(l>1) column vector of baseline codebook $c^j$ is transformed by a specific level of long-term spatial correlation matrix $$\sum_{i=l}^{M} \bar{R}_{ki} c^l_j$$

according to normalization equation $$\text{normalize}\left(\sum_{i=l}^{M} \bar{R}_{ki} c^l_j\right)$$

to align to the direction of the $l^{th}$ eigenvector.

In an embodiment of the present invention, the last column (or $r^{th}$ column) of codebook $c_j$ is transformed by a specific level of spatial correlation matrix $$\sum_{i=r}^{M} \bar{R}_{ki}$$

to align to the direction of the $r^{th}$ eigenvector, that is $$\text{normalize}\left(\sum_{i=r}^{M} \bar{R}_{ki} c_j^r\right).$$

According to an embodiment, a new high rank adaptive codebook is constructed using all transformed column vectors:

$$\tilde{c}_j = \text{normalize}\left(\left[\text{normalize}\left(\sum_{i=1}^{M} \bar{R}_{ki} c_j^1\right) \ldots \text{normalize}\left(\sum_{i=r}^{M} \bar{R}_{ki} c_j^r\right)\right]\right),$$

where $\tilde{c}_j \in \{\tilde{c}_1, \ldots, \tilde{c}_S\}^{M \times r}$.

If each codebook in the baseline codebook set is transformed to be a corresponding high rank adaptive codebook, then a new high rank adaptive codebook set is obtained.

It should be understood that in other embodiments of the present invention, the above method may further comprise other steps. For example, if the baseline codebook set is not pre-generated, then the above method may further comprise a step of determining a baseline codebook set. For another example, if it is desired to have a unitary matrix as the adaptive codebook, then some kind of orthogonalization operation, such as, Gram-Schmit scheme (or QR decomposition), singular value decomposition (SVD), zero forcing (ZF) scheme, etc., may be further applied for the new high rank adaptive codebook.

Since the baseline codebook set and long-term spatial correlation information are known simultaneously for both the user equipment and the cell (corresponding to the base station), the new adaptive codebook can also be acquired by users and the cell according to the same generating rule.

Figure 2:
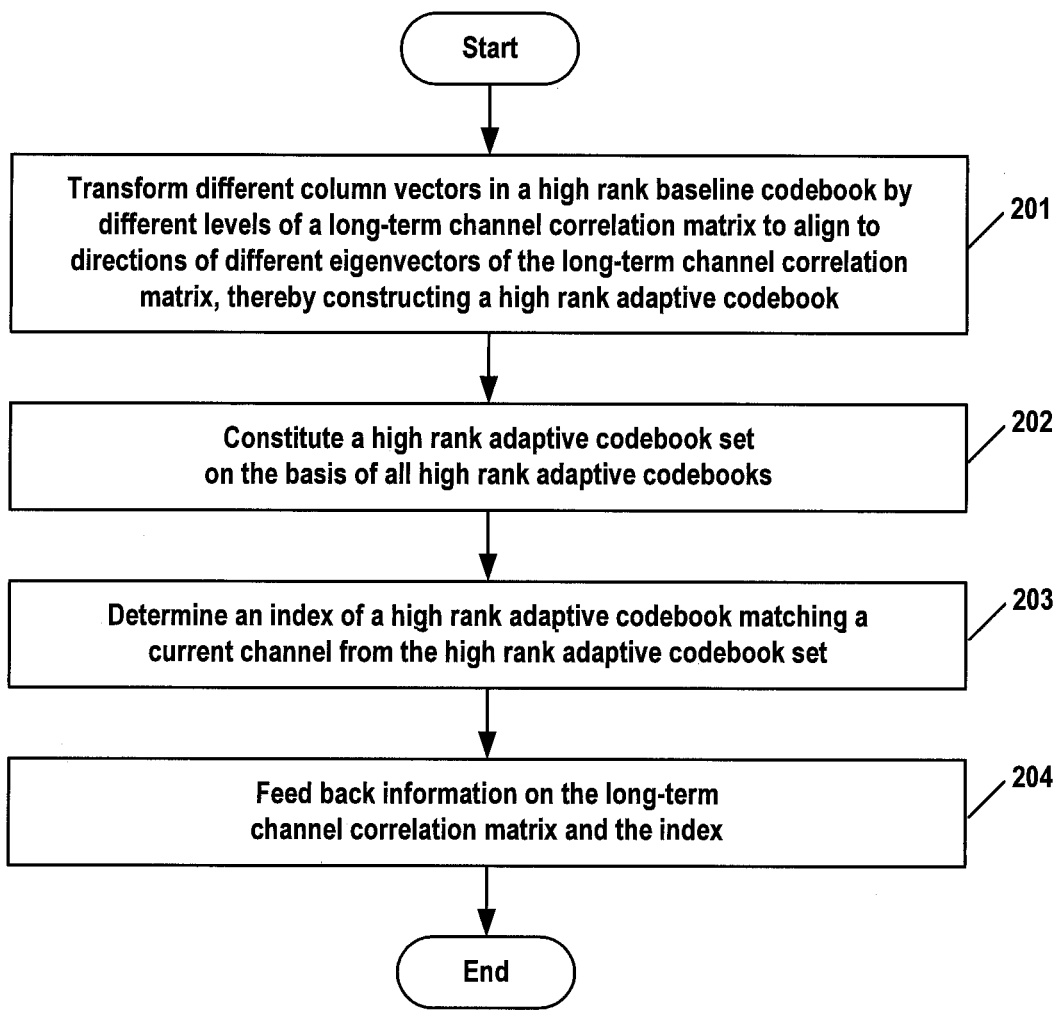
FIG. 2 shows a flowchart of a method for feeding back channel information in a MIMO communication system according to an embodiment of the present invention.

FIG. 2 shows a flowchart of a method for feeding back channel information in a MIMO communication system according to an embodiment of the present invention. As shown in FIG. 2, at step 201 different column vectors in a high rank baseline codebook are transformed by different levels of a long-term channel correlation matrix to align to directions of different eigenvectors of the long-term channel correlation matrix, thereby constructing a high rank adaptive codebook. At step 202 a high rank adaptive codebook set is constituted on the basis of all high rank adaptive codebooks. At step 203, an index of a high rank adaptive codebook matching a current channel is determined from the high rank adaptive codebook set. At step 204, information on the long-term channel correlation matrix and the index is fed back.

According to an embodiment of the present invention, the above method is implemented in the receiving apparatus.

Still consider such a system, wherein the transmitting apparatus is, for example, a base station of a cell with M transmitting antennas, the receiving apparatus is, for example, user equipment UE with N Rx antennas, the number of transmitted data streams is r, wherein r is less than or equal to M. Then, the receiving apparatus may obtain an adaptive codebook whose rank is r through step 201. Concrete details have been described with reference to FIG. 1 and thus are not detailed here. If at step 201 each codebook in the baseline codebook set is transformed to obtain a corresponding high rank adaptive codebook, then at step 202 all high rank adaptive codebooks constitute a high rank adaptive codebook set.

According to an embodiment of the present invention, at step 203 high rank channel quantization may be performed by the obtained high rank adaptive codebook and short-term channel response, so as to determine the index. The channel quantization may be performed according to various methods.

According to an embodiment of the present invention, the high rank channel quantization may be performed according to a minimum chordal distance, or a proper high rank precoder is directly selected to match the channel information according to a maximum post-processing Signal-to-Noise Ratio (SINR) or channel capacity.

According to an embodiment of the present invention, the minimum chordal distance rule may be applied for rank r channel quantization. A current channel may be represented according to a current short-term channel eigenvector. In an embodiment, from downlink channel measurement, user equipment k can acquire r different eigenvectors $[V_{k1} \ldots V_{kr}]$ of short-term sub-band. Then the $1^{st} \sim r^{th}$ eigenvectors are quantized by the obtained rank r adaptive codebook according to the collinearity rule:

$$\begin{bmatrix} \hat{V}_{k1} \\ \vdots \\ \hat{V}_{kr} \end{bmatrix} = \underset{\{\tilde{c}_j^T\}_{j=1,\ldots,S}}{\arg\max} \frac{|\text{trace}([V_{k1} \ldots V_{kr}]^H \tilde{c}_j^*)|}{\|[V_{k1} \ldots V_{kr}]\|_F},$$

so as to determine the high rank adaptive codebook matching the current channel.

According to an embodiment of the present invention, at step 204 user equipment k can feed back to the base station the determined index of the high rank adaptive codebook matching the current channel. At the same time, user equipment k can feed back information on the long-term channel correlation matrix.

At the other end, the base station can determine a corresponding codebook in the baseline codebook set upon receipt of the index fed back. The codebook is transformed using the received information on the long-term channel correlation matrix, and an adaptive codebook is generated according to the same rule as applied at user equipment k. Hence, the base station can use the adaptive codebook as a preferred transmitting precoder or channel quantization for its serving cell. The transmitting precoder of user equipment k can be represented as $$\begin{bmatrix} \hat{V}_{k1} \\ \vdots \\ \hat{V}_{kr} \end{bmatrix}^H,$$

or be further scheduled with other users by zero forcing (ZF) for MU-MIMO.

Detailed description is presented below in conjunction with FIG. 3.

Figure 3:
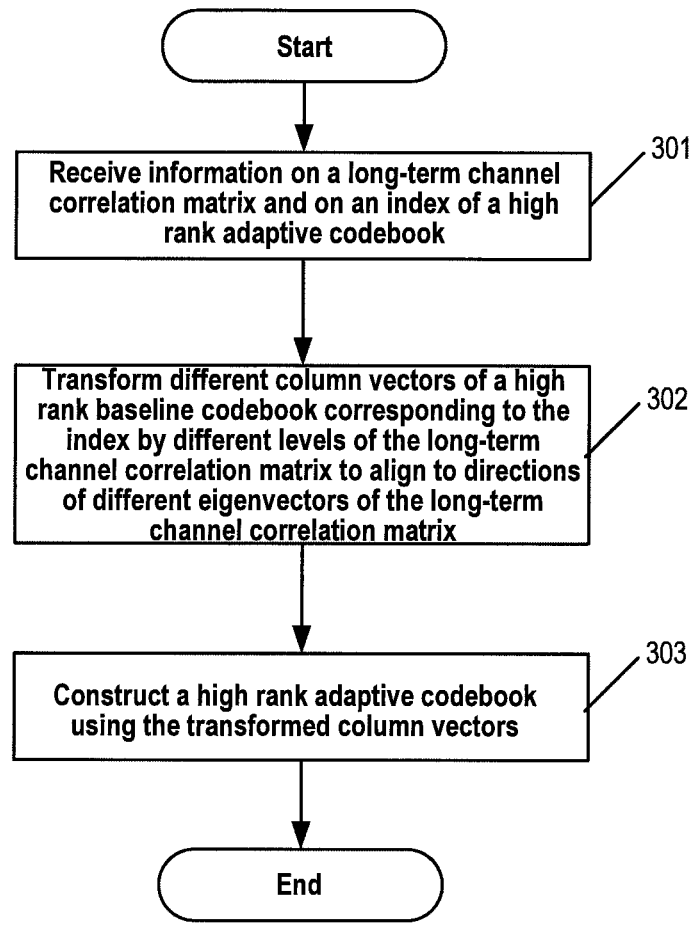
FIG. 3 shows a flowchart of a method for processing channel information in a MIMO communication system according to another embodiment of the present invention.

FIG. 3 shows a flowchart of a method for processing channel information in a MIMO communication system according to an embodiment of the present invention. As shown in FIG. 3, at step 301, information on a long-term channel correlation matrix and on an index of a high rank adaptive codebook is received. At step 302, different column vectors of a high rank baseline codebook corresponding to the index are transformed by different levels of the long-term channel correlation matrix to align to directions of different eigenvectors of the long-term channel correlation matrix. At step 303, a high rank adaptive codebook is constructed using the transformed column vectors.

According to an embodiment of the present invention, the above method is implemented at the transmitting apparatus.

According to an embodiment of the present invention, at step 302, the l column vector of the high rank baseline codebook is transformed by the 1 to M levels of the long-term spatial correlation matrix, wherein l≥1, M is the number of Tx antennas, and M also corresponds to the total number of levels of the long-term spatial correlation matrix.

According to an embodiment of the present invention, the long-term channel correlation matrix is a quantized M×M long-term spatial correlation matrix $\overline{R}_k$ of user equipment k, which is represented as below:

$$\overline{R}_k = \sum_{i=1}^{M} \overline{R}_{ki} = \sum_{i=1}^{M} \overline{\lambda}_{ki} \overline{V}_{ki} \overline{V}_{ki}^H,$$

where:
$\overline{\lambda}_{ki}$ is the $i^{th}$ eigenvalue of $\overline{R}_k$, (i=1, ..., M), and $\overline{\lambda}_{k1} > ... > \overline{\lambda}_{kM}$;
$\overline{V}_{ki}$ is the $i^{th}$ eigenvector of $\overline{R}_k$, and
$\overline{R}_{ki}$ is the covariance matrix related to the $i^{th}$ eigenvector $\overline{V}_{ki}$.

High rank baseline codebook $c_j$ corresponding to the index is represented as below:

$$c_j = [c^1_j \ldots c^r_j] \in \{c_1, \ldots, c_S\}^{M \times r},$$

where:
$c_j$ is a high rank baseline codebook with M×r dimension;
$c^i_j$ is the l column vector with M×1 dimension of $c_j$ (i=1, ..., r) then, in the transformation,
the $l^{th}$ (l>1) column vector $c^l_j$ of high rank baseline codebook $c_j$, is transformed by a specific level of the long-term spatial correlation matrix $$\sum_{i=l}^{M} \overline{R}_{ki} c^l_j$$

according to normalization equation $$\text{normalize}\left(\sum_{i=l}^{M} \overline{R}_{ki} c^l_j\right)$$

to align to the direction of the $l^{th}$ eigenvector.

Figure 4:
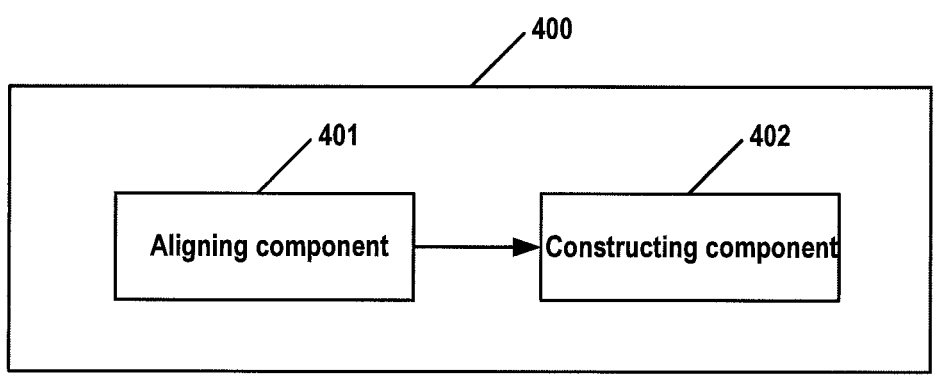
FIG. 4 shows a block diagram of an apparatus for generating a high rank adaptive codebook in a MIMO communication system according to an embodiment of the present invention.

FIG. 4 shows a block diagram of an apparatus 400 for generating a high rank adaptive codebook in a MIMO communication system according to an embodiment of the present invention. As shown in FIG. 4, the apparatus 400 comprises an aligning component 401 and a constructing component 402. The aligning component 401 is configured for transforming different column vectors in a high rank baseline codebook by different levels of a long-term channel correlation matrix to align directions of different eigenvectors of the long-term channel correlation matrix. The constructing component 402 is configured for constructing the high rank adaptive codebook by the transformed column vectors.

According to an embodiment of the present invention, when the aligning component is performing the transformation, all column vectors, except for the first column, of the high rank baseline codebook are not transformed by the whole long-term spatial correlation matrix but transformed by only partial levels thereof. For example, the 1 column vector is transformed by (M−l+1) levels corresponding to lower eigenvalues, wherein M is the number of Tx antennas.

According to an embodiment of the present invention, when the long-term spatial correlation matrix is divided into levels from highest to lowest according to eigenvalues as illustrated above, the $l^{th}$ column vector of the high rank baseline codebook is transformed by $l^{th}$ to $M^{th}$ levels of the long-term spatial correlation matrix to align to the direction of the $l^{th}$ ergenvector.

According to an embodiment of the present invention, the long-term channel correlation matrix is a M×M quantized long-term spatial correlation matrix $\overline{R}_k$ of user equipment k, which may be represented through identical transformation as below:

$$\overline{R}_k = \sum_{i=1}^{M} \overline{R}_{ki} = \sum_{i=1}^{M} \overline{\lambda}_{ki} \overline{V}_{ki} \overline{V}_{ki}^H,$$

where:
$\overline{\lambda}_{ki}$ is the $i^{th}$ eigenvalue of $\overline{R}_k$, (i=1, ..., M), and $\overline{\lambda}_{k1} > ... > \overline{\lambda}_{kM}$;
$\overline{V}_{ki}$ is the $i^{th}$ eigenvector of $\overline{R}_k$, and
$\overline{R}_{ki}$ is the covariance matrix related to the $i^{th}$ eigenvector $\overline{V}_{ki}$.

The high rank baseline codebook with rank r is represented as below:

$$c_j = [c^1_j \ldots c^r_j] \in \{c_1, \ldots, c_S\}^{M \times r},$$

where:
S is the number of codebooks in the, codebook set,
$c_j$ is a high rank baseline codebook with M×r dimension;
$c^i_j$ is the $l^{th}$ column vector with M×1 dimension of $c_j$, l=1, ..., r;
then, in the transformation,
the $l^{th}$(l>1) column vector $c^l_j$ of high rank baseline codebook $c_j$ is transformed by a specific level of the long-term spatial correlation matrix $$\sum_{i=l}^{M} \overline{R}_{ki} c^l_j$$

according to normalization equation $$\text{normalize}\left(\sum_{i=l}^{M} \overline{R}_{ki} c^l_j\right)$$

to align to the direction of the $l^{th}$ eigenvector.

According to an embodiment of the present invention, the apparatus 400 generates the long-term channel correlation matrix according to a measured channel response.

According to an embodiment of the present invention, the apparatus 400 obtains the long-term channel correlation matrix by receiving information on the long-term channel correlation matrix.

Figure 5:
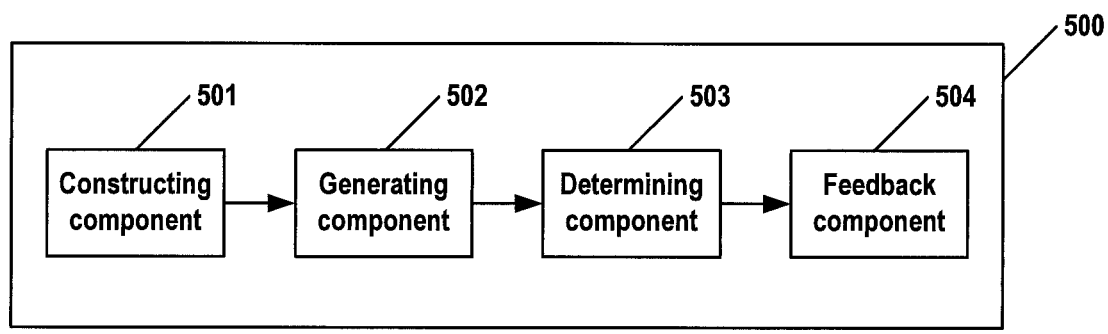
FIG. 5 shows a block diagram of an apparatus for feeding back channel information in a MIMO communication system according to an embodiment of the present invention.

FIG. 5 shows a block diagram of an apparatus 500 for feeding back channel information in a MIMO communication system according to an embodiment of the present invention. As shown in FIG. 5, the apparatus 500 comprises: a constructing component 501, a generating component 502, a determining component 503 and a feedback component 504. The constructing component 501 transforms different column vectors in a high rank baseline codebook by different levels of a long-term channel correlation matrix to align to directions of different eigenvectors of the long-term channel correlation matrix, thereby constructing a high rank adaptive codebook. The generating component 502 constructs a high rank adaptive codebook set on the basis of all high rank adaptive codebooks. The determining component 503 determines an index of a high rank adaptive codebook matching a current channel from the high rank adaptive codebook set. The feedback component 504 feeds back information on the long-term channel correlation matrix and the index.

According to an embodiment of the present invention, high rank channel quantization is performed by the high rank adaptive codebook and a short-term channel response, so as to determine the index.

According to an embodiment of the present invention, the high rank channel quantization is performed according to a minimum chordal distance.

According to an embodiment of the present invention, the performing high rank channel quantization comprises: quantizing eigenvectors $[V_{k1} \ldots V_{kr}]$ of the short-term channel response by the high rank adaptive codebook $\tilde{c}^j$ according to the following equation:

$$\begin{bmatrix} \hat{V}_{k1} \\ \vdots \\ \hat{V}_{kr} \end{bmatrix} = \underset{\{\tilde{c}_j^T\}_{j=1,\ldots,S}}{\operatorname{argmax}} \frac{|\operatorname{trace}([V_{k1} \ldots V_{kr}]^H \tilde{c}_j^*)|}{\|[V_{k1} \ldots V_{kr}]\|_F},$$

so as to determine from the high rank adaptive codebook set the index of the high rank adaptive codebook matching the current channel, where $\tilde{c}_j \in \{\tilde{c}_1, \ldots \tilde{c}_S\}^{M \times R}$, M is the number of Tx antennas, and r is the rank of the communication system.

According to an embodiment of the present invention, the high rank channel quantization is determined according to a maximum post-processing Signal-to-Noise Ratio (SINR) or channel capacity. The determined matching high rank adaptive codebook is selected as a high rank precoder.

Figure 6:
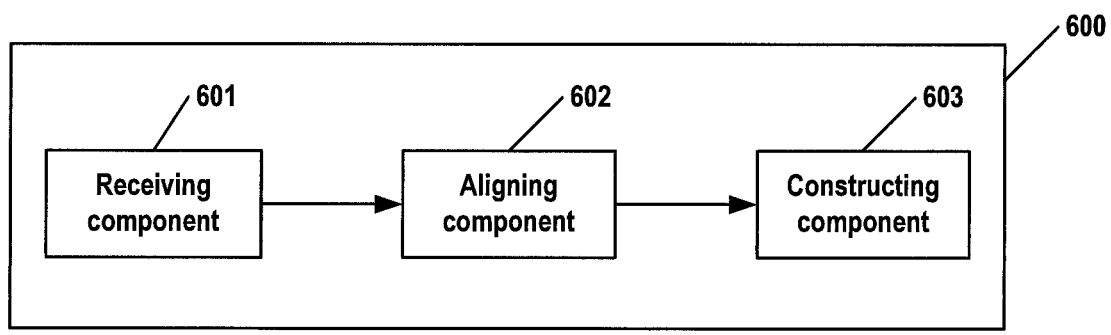
FIG. 6 shows a block diagram of an apparatus for processing channel information in a MIMO communication system according to another embodiment of the present invention.

FIG. 6 shows a block diagram of an apparatus 600 for processing channel information in a MIMO communication system according to an embodiment of the present invention. As shown in FIG. 6, the apparatus 600 comprises a receiving component 601, an aligning component 602 and a constructing component 603. The receiving component 601 receives information on a long-term channel correlation matrix and on an index of a high rank adaptive codebook. The aligning component 602 transforms different column vectors of a high rank baseline codebook corresponding to the index by different levels of the long-term channel correlation matrix to align to directions of different eigenvectors of the long-term channel correlation matrix. The constructing component 603 constructs a high rank adaptive codebook using the transformed column vectors.

According to an embodiment of the present invention, when the aligning component 602 is performing the transformation, all column vectors, except for the first column, of the high rank baseline codebook are not transformed by the whole long-term spatial correlation but transformed by only partial levels of the long-term spatial correlation matrix, for example, by (M−l+1) levels corresponding to lower eigenvalues, wherein M is the number of transmitting antennas.

According to an embodiment of the present invention, when the long-term spatial correlation matrix is divided into levels from highest to lowest according to eigenvalues as illustrated above, the $l^{th}$ column vector of the high rank baseline codebook is transformed by $l^{th}$ to $M^{th}$ levels of the long-term spatial correlation matrix to align to the direction of the $l^{th}$ eigenvector.

The long-term channel correlation matrix is a quantized M×M long-term spatial correlation matrix $\bar{R}_k$ of user equipment k, which is represented as below:

$$\bar{R}_k = \sum_{i=1}^{M} \bar{R}_{ki} = \sum_{i=1}^{M} \bar{\lambda}_{ki} \bar{V}_{ki} \bar{V}_{ki}^H,$$

where:
$\bar{\lambda}_{ki}$ is the $i^{th}$ eigenvalue of $\bar{R}_k$, (i=1, ..., M), and $\bar{\lambda}_{k1} > \ldots > \bar{\lambda}_{kM}$;
$\bar{V}_{ki}$ is the $i^{th}$ eigenvector of $\bar{R}_k$, and
$\bar{R}_{ki}$ is the covariance matrix related to the $i^{th}$ eigenvector $\bar{V}_{ki}$.

high rank baseline codebook $c_j$ corresponding to the index is represented as below:

$$c_j = [c^1_j \ldots c^r_j] \in \{c_1, \ldots, c_S\}^{M \times r},$$

where:
$c_j$ is a high rank baseline codebook with M×r dimension;
$c^l_j$ is the $l^{th}$ column vector with M×1 dimension of $c_j$, l=1, ..., r;

then, in the transformation, the $l^{th}$ column vector $c^l_j$ of high rank baseline codebook $c^j$ is transformed by a specific level of the long-term spatial correlation matrix $$\sum_{i=l}^{M} \bar{R}_{ki} c^l_j$$

according to normalization equation $$\operatorname{normalize}\left(\sum_{i=l}^{M} \bar{R}_{ki} c^l_j\right)$$

to align to the direction of the $l^{th}$ eigenvector.

Figure 7:
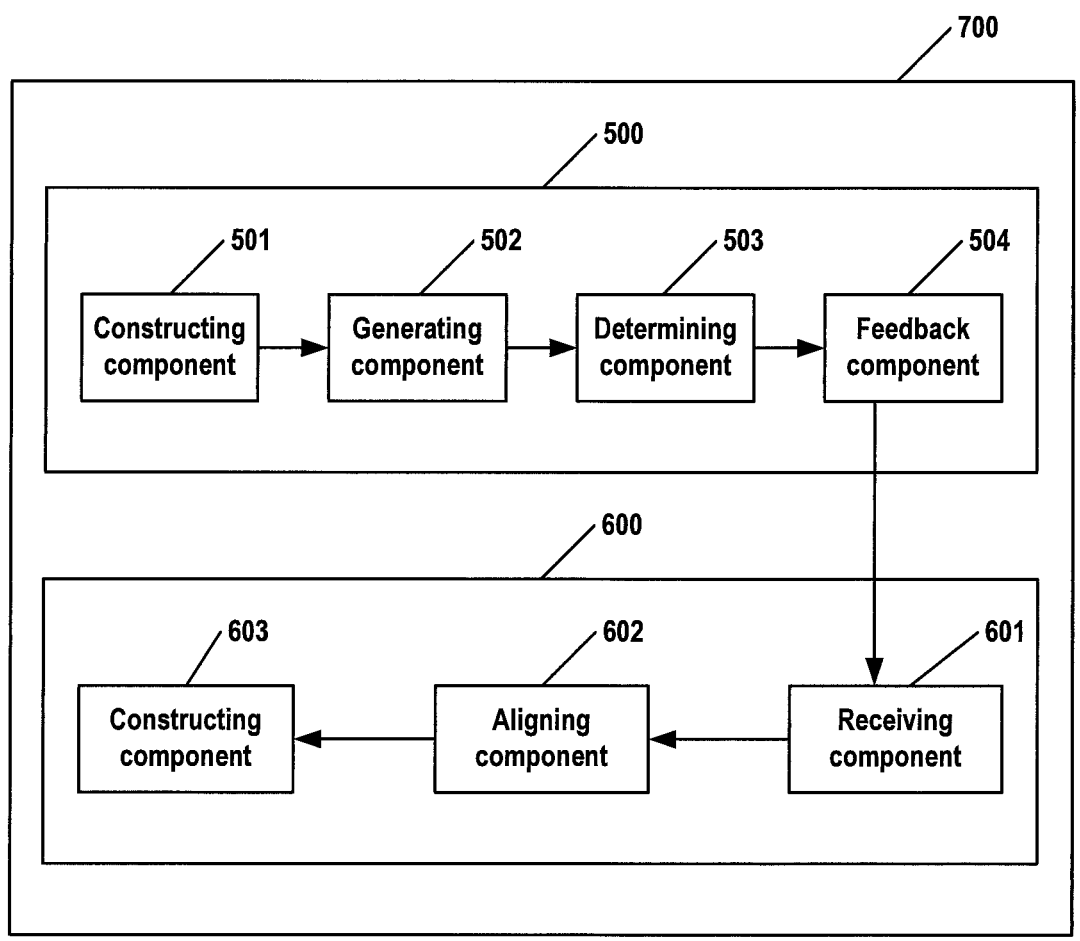
FIG. 7 shows a block diagram of a MIMO communication system according to an embodiment of the present invention.

FIG. 7 shows a block diagram of a MIMO communication system 700 according to an embodiment of the present invention. As shown in FIG. 7, the system 700 comprises an apparatus 500 and an apparatus 600. The apparatus 500 comprises: a constructing component 501, a generating component 502, a determining component 503 and a feedback component 504. The apparatus 600 comprises a receiving component 601, an aligning component 602 and a constructing component 603.

In the embodiment shown in FIG. 7, the constructing component 501 transforms different column vectors in a high rank baseline codebook by different levels of a long-term channel correlation matrix to align to directions of different eigenvectors of the long-term channel correlation matrix, thereby constructing a high rank adaptive codebook. The generating component 502 constructs a high rank adaptive codebook set on the basis of all high rank adaptive codebooks. The determining component 503 determines an index of a high rank adaptive codebook matching a current channel from the high rank adaptive codebook set. The feedback component 504 feeds back to the apparatus 600 information on the long-term channel correlation matrix and the index.

Subsequently, the receiving apparatus 600 processes information fed back from a feedback channel. Specifically, the receiving component 601 receives information on a long-term channel correlation matrix and on an index of a high rank adaptive codebook. The aligning component 602 transforms different column vectors of a high rank baseline codebook corresponding to the index by different levels of the long-term channel correlation matrix to align to directions of different eigenvectors of the long-term channel correlation matrix. The constructing component 603 constructs a high rank adaptive codebook using the transformed column vectors.

Figure 8:
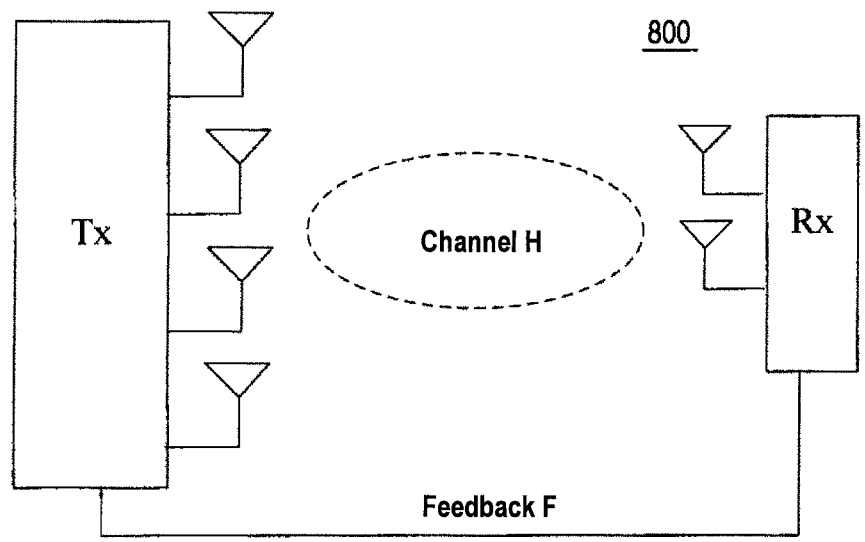
FIG. 8 shows a schematic view of a MIMO system in which embodiments of the present invention may be applied.

FIG. 8 shows a schematic view of a MIMO system 800 in which the embodiments of the present invention may be applied. The system 800 comprises a transmitting apparatus Tx and a receiving apparatus Rx. The transmitting apparatus has M (M is an integer more than or equal to 1) transmitting antennas, e.g., 4 transmitting antennas shown in the figure. The receiving apparatus Rx has N (N is an integer more than or equal to 1) receiving antennas, e.g., 2 receiving antennas shown in the figure. A MIMO channel H is constructed between the transmitting apparatus Tx and the receiving apparatus Rx. The receiving apparatus Rx may feed back information on the MIMO channel H to the transmitting apparatus Tx. In an embodiment, the system 800 transmits 2 data streams in the same sub-frequency band and the same frame; that is, the rank r is 2.

The embodiments of the present invention may be applied to downlink transmission. In this case, for example, the transmitting apparatus Tx may be a base station, and the receiving apparatus Rx may be user equipment. Although FIG. 8 illustrates only one receiving apparatus, it should be noted that the present invention may not only correspond to single-user MIMO (SU-MIMO) schemes, but also may be applied to multi-user MIMO (MU-MIMO) schemes. For MU-MIMO cases, each user equipment may independently employ the spatial correlation based codebook generating and feedback schemes according to embodiments of the present invention.

The embodiments of the present invention may also be applied to uplink transmission. In this case, for example, the transmitting apparatus Tx may be user equipment, while the receiving apparatus Rx may be a base station.

According to an embodiment of the present invention, for high rank SU/MU-MIMO, the spatial correlation based adaptive codebook design and feedback mechanism is described as below.

Long-term Spatial Correlation Matrix Feedback

Each UE detects downlink (DL) channel according to DL reference signals, calculates a long-term wideband spatial correlation matrix averaged over multiple sub-bands and multiple subframes, quantizes and feeds back the matrix to its serving cell.

For example, user equipment k has its M×M dimensional quantized long-term spatial correlation matrix $\bar{R}_k$:

$$\bar{R}_k = \sum_{i=1}^{M} \bar{R}_{ki} = \sum_{i=1}^{M} \bar{\lambda}_{ki} \bar{V}_{ki} \bar{V}_{ki}^H,$$

where:
$\bar{\lambda}_{ki}$ is the $i^{th}$ eigenvalue of $\bar{R}_k$, (i=1, ..., M), and $\bar{\lambda}_{k1} > ... > \bar{\lambda}_{kM}$;
$\bar{V}_{ki}$ is the $i^{th}$ eigenvector of $\bar{R}_k$, and
$\bar{R}_{ki}$ is the covariance matrix related to the $i^{th}$ eigenvector $\bar{V}_{ki}$.

High Rank Adaptive Codebook Design

A baseline codebook with rank r is denoted as follows:

$$c_j = [c^1_j \ldots c^r_j] \in \{c_1, \ldots, c_S\}^{M \times r},$$

where:
$c_j$ is a M×r codebook matrix with size $S=2^B$,
$c^i_j$ is the $j^{th}$ column vector with M×1 dimension of codebook $c_j$, (i=1, ..., r)

The adaptive codebook is transformed according to a long-term spatial correlation matrix of each user.

In order to align to beamforming directions corresponding to different levels of eigenvectors, the different column vectors in the baseline codebook should be rotated by different levels of the spatial correlation matrix.

For example the first column of codebook $c_j$ is transformed by the whole spatial correlation $$\bar{R}_k = \sum_{i=1}^{M} \bar{R}_{ki}$$

to align to a dominant eigenvector direction, that is $$\text{normalize}\left(\sum_{i=1}^{M} \bar{R}_{ki} c^1_j\right),$$

where normalize (•) is the operation of normalization.

The last column (or $r^{th}$ column) of codebook $c_j$ is transformed by a specific level of spatial correlation matrix $$\sum_{i=r}^{M} \bar{R}_{ki}$$

to align to the direction of the $r^{th}$ eigenvector, that is $$\text{normalize}\left(\sum_{i=r}^{M} \bar{R}_{ki} c^r_j\right).$$

Finally all the above transformed column vectors constitute a new high rank adaptive codebook:

$$\tilde{c}_j = \text{normalize}\left(\left[\text{normalize}\left(\sum_{i=1}^{M} \bar{R}_{ki} c^1_j\right) \ldots \text{normalize}\left(\sum_{i=r}^{M} \bar{R}_{ki} c^r_j\right)\right]\right),$$

where $\tilde{c}_j \in \{\tilde{c}_1, \ldots \tilde{c}_S\}^{M \times R}$.

If it is desired to have a unitary matrix as the codeword, then some kind of orthogonalization operation, such as Gram-Schmit scheme (or QR decomposition), singular value decomposition (SVD) and zero forcing (ZF) scheme, should be further applied for the new high rank adaptive codebook.

Since the baseline codebook set and the long-term spatial correlation information are known simultaneously for both users and the cell, the users and the cell may also acquire a new adaptive codebook according to the same design rule.

High Rank Adaptive Codebook Feedback

With the newly generated adaptive codebook, high rank channel quantization may be performed according to minimum chordal distance, or a proper high rank precoder may be selected to match the channel information according to maximum post-processing SINR or channel capacity.

For example the minimum chordal distance rule is applied for rank r channel quantization. From downlink channel measurement, the user can acquire different levels of short-term sub-band eigenvectors $[V_{k1} \ldots V_{kr}]$. Then the first to $r^{th}$ eigenvectors are quantized by the rank r adaptive codebook according to the collinearity rule $$\begin{bmatrix} \hat{v}_{k1} \\ \vdots \\ \hat{v}_{kr} \end{bmatrix} = \underset{\{\tilde{c}_j^T\}j=1,\ldots,S}{\operatorname{argmax}} \frac{|\operatorname{trace}([V_{k1} \ldots V_{kr}]^H \tilde{c}_j^*)|}{\|[V_{k1} \ldots V_{kr}]\|_F},$$

Rank k adaptive codebook feedback may be used as a preferred transmitting precoder or channel quantization for its serving cell. The transmitting precoder can be represented as $$\begin{bmatrix} \hat{v}_{k1} \\ \vdots \\ \hat{v}_{kr} \end{bmatrix}^H$$

for user equipment k, or be further scheduled with other users by zero forcing (ZF) for MU-MEMO.

System Performance Evaluations Through System Level Simulations

System performance evaluations are focused on FDD SU-MIMO in 3GPP case 1 SCM-UMa scenario. 4×2 Tx/Rx antenna deployment is assumed. SU-MIMO is rank-2 transmission. Baseline 4×2 Rel-8 codebook is used for adaptive codebook transformation and channel quantization. Detailed simulation parameters are listed in table 1.

Four kinds of codebook generating and feedback schemes as shown have been evaluated and compared below:
1) Baseline codebook without transformation: $c_j = [c_j^1 c_j^2]$
2) Adaptive codebook scheme I, which transforms all column vectors by the whole long-term spatial correlation $$\bar{R}_k = \sum_{i=1}^{M} \bar{R}_{ki} : \tilde{c}_j$$

$$= \operatorname{normalize}\left(\left[\operatorname{normalize}\left(\sum_{i=1}^{M} \bar{R}_{ki} c_j^1\right) \operatorname{normalize}\left(\sum_{i=1}^{M} \bar{R}_{ki} c_j^2\right)\right]\right)$$

3) Adaptive codebook scheme II, which transforms only the first column vector:

$$\tilde{c}_j = \operatorname{normalize}\left(\left[\operatorname{normalize}\left(\sum_{i=1}^{M} \bar{R}_{ki} c_j^1\right) \; c_j^2\right]\right)$$

4) Adaptive codebook scheme III (recommended) according to the embodiments of the present invention:

$$\tilde{c}_j = \operatorname{normalize}\left(\left[\operatorname{normalize}\left(\sum_{i=1}^{M} \bar{R}_{ki} c_j^1\right) \operatorname{normalize}\left(\sum_{i=1}^{M} \bar{R}_{ki} c_j^2\right)\right]\right)$$

Adaptive codebook scheme I is the traditional high rank adaptive feedback scheme. After system level simulations, it is found that adaptive codebook scheme I has 12% loss of cell average throughput over normal codebook feedback without transformation. If only transformation in the first column of baseline codebook, adaptive codebook scheme II has only 3% gains of cell average throughput and 27% gains of cell edge throughput. But using adaptive codebook scheme III according to the embodiments of the present invention, it is found that high rank adaptive codebook feedback has explicit system performance improvement, coupled with 22% gains of cell average throughput and 24% gains of cell edge throughput.

TABLE 1

Simulation Parameters

| Parameter | Assumption |
| --- | --- |
| Duplex method | FDD |
| Scenario | 3GPP case 1 with SCM-UMa |
| DL transmission scheme | SU-MIMO: fixed rank 2 per UE |
| PMI/CQI measurement and feedback | 5-subframe feedback period for sub-band PMI/CQI |
| | 20-subframe feedback period for wideband covariance matrix R (w/o quantization) |
| | 6-subframe feedback delay |
| Channel estimation error | Ideal |
| UE speed | 3 km/h |
| Scheduler | Greedy search algorithm based on PF |
| Link to system mapping | RBIR |
| Control overhead | Fixed 0.3063 |

TABLE 2

System Level Simulation Results

| Transmit scheme | Cell average spectrum efficiency (bps/Hz/cell) | Cell-edge spectrum efficiency (bps/Hz) |
| --- | --- | --- |
| SU-MIMO w/o transformation | 1.96 (1.00) | 0.033 (1.00) |
| SU-MIMO w/ adaptive codebook I | 1.73 (0.88) | 0.037 (1.12) |
| SU-MIMO w/ adaptive codebook II | 2.01 (1.03) | 0.042 (1.27) |
| SU-MIMO w/ adaptive codebook III | 2.39 (1.22) | 0.041 (1.24) |

The embodiments of the present invention propose an enhanced adaptive codebook generating and feedback mechanism based on long-term spatial correlation feedback to further improve high rank channel feedback accuracy and the corresponding system performance. Each column vector in the high rank baseline codebook is transformed by a specific level of the spatial correlation matrix to align to a beamforming direction of the specific level of the eigenvector, and then each column vector in the newly generated adaptive codebook can be used to quantize a specific eigenvector more accurately. System level simulations have proven that the adaptive codebook scheme proposed by the embodiments of the present invention has superior system performance gains without any additional feedback overhead. This kind of adaptive codebook can be used for any antenna deployment (e.g., co-polarized or cross-polarized), any transmitting antenna number (e.g., 4Tx or 8Tx antennas), any transmission rank and any multi-antenna scheme (e.g., SU-MIMO or MU-MIM0).

The embodiments of the present invention have been described above. However, the present invention is not limited to specific systems, apparatuses or concrete protocols.

Various variations or modifications may be made by those skilled in the art within the scope of the claims as appended.

What is claimed is:

1. A method for generating a high rank adaptive codebook in a Multiple Input Multiple Output communication system, comprising:
    transforming different column vectors in a high rank baseline codebook by different levels of a long-term channel correlation matrix to align to directions of different eigenvectors of the long-term channel correlation matrix; and
    using the transformed column vectors to construct a high rank adaptive codebook,
        wherein different column vectors in the baseline codebook are rotated by the different levels of the spatial correlation matrix, and
        wherein the channel correlation matrix is divided into levels according to its eigenvectors, and if a channel correlation matrix has a corresponding number of eigenvectors and eigenvalues, a covariance matrix related to an eigenvector of the largest eigenvalue is allocated the first level, and a covariance matrix related to an eigenvector of the second largest eigenvalue is allocated to the second level; and
    transmitting data from a transmitter by employing the high rank adaptive codebook.

2. The method according to claim 1, wherein during the transformation, the $l^{th}$ column vector of the high rank baseline codebook is transformed by the $l^{th}$ to $M^{th}$ levels of the long-term spatial correlation matrix, wherein $l \geq 1$ and M is the number of transmitting antennas.

3. The method according to claim 1, wherein
    the long-term channel correlation matrix is a M×M quantized long-term spatial correlation matrix $\overline{R}_k$ of user equipment k, which may be represented through identical transformation as below:

$$\overline{R}_k = \sum_{i=1}^{M} \overline{R}_{ki} = \sum_{i=1}^{M} \overline{\lambda}_{ki} \overline{V}_{ki} \overline{V}_{ki}^H,$$

wherein:
$\overline{\lambda}_{ki}$ is the $i^{th}$ eigenvalue of $\overline{R}_k$, (i=1, ..., M), and $\overline{\lambda}_{k1} > ... > \overline{\lambda}_{kM}$,
$\overline{V}_{ki}$ is the $i^{th}$ eigenvector of $\overline{R}_k$,
$\overline{R}_{ki}$ is the covariance matrix related to the $i^{th}$ eigenvector $\overline{V}_{ki}$;
the high rank baseline codebook with rank r is represented as below:

$$c_j = [c^1_j \ldots c^r_j] \in \{c_1, \ldots c_S\}^{M \times r},$$

wherein:
S is the number of codebooks in the codebook set,
$c_j$ is a high rank baseline codebook with M×r dimension,
$c^l_j$ is $l^{th}$ column vector with M×1 dimension of $c_j$, l=1, ..., r;
then, during the transformation,
the $l^{th}$ column vector $c^l_j$ of high rank baseline codebook is transformed by a specific level of the long-term spatial correlation matrix $$\sum_{i=l}^{M} \overline{R}_{ki} c^l_j$$

according to normalization equation $$\text{normalize}\left(\sum_{i=l}^{M} \overline{R}_{ki} c^l_j\right)$$

to align to the direction of the $l^{th}$ eigenvector.

4. The method according to claim 3, wherein the high rank adaptive codebook is constructed using all transformed column vectors according to the equation below:

$$\tilde{c}_j = \text{normalize}\left(\left[\text{normalize}\left(\sum_{i=1}^{M} \overline{R}_{ki} c^1_j\right) \ldots \text{normalize}\left(\sum_{i=r}^{M} \overline{R}_{ki} c^r_j\right)\right]\right),$$

wherein $\tilde{c}_j \in \{\tilde{c}_1, \ldots, \tilde{c}_S\}^{M \times r}$.

5. The method according to claim 1, wherein the long-term channel correlation matrix is generated using a measured channel response.

6. The method according to claim 1, wherein the long-term channel correlation matrix is acquired by receiving information from k.

7. A method for feeding back channel information in a Multiple Input Multiple Output communication system, comprising:
    transforming different column vectors in a high rank baseline codebook by different levels of a long-term channel correlation matrix to align to directions of different eigenvectors of the long-term channel correlation matrix, thereby constructing a high rank adaptive codebook;
    constituting a high rank adaptive codebook set on the basis of all high rank adaptive codebooks;
    determining from the high rank adaptive codebook set an index of a high rank adaptive codebook matching a current channel; and
    feeding back information on the long-term channel correlation matrix and the index to a serving cell,
        wherein different column vectors in the baseline codebook are rotated by the different levels of the spatial correlation matrix, and
        wherein the channel correlation matrix is divided into levels according to its eigenvectors, and if a channel correlation matrix has a corresponding number of eigenvectors and eigenvalues, a covariance matrix related to an eigenvector of the largest eigenvalue is allocated the first level, and a covariance matrix related to an eigenvector of the second largest eigenvalue is allocated to the second level.

8. The method according to claim 7, wherein high rank channel quantization is performed by the high rank adaptive codebook and a short-term channel response, so as to determine the index.

9. The method according to claim 8, wherein the high rank channel quantization is performed according to a minimum chordal distance.

10. The method according to claim 9, wherein the performing high rank channel quantization comprises:

quantizing the short-term channel response $[V_{k1} \ldots V_{kr}]$ of user equipment k by the high rank adaptive codebook $\tilde{c}_j$ according to the following equation:

$$\begin{bmatrix} \hat{v}_{k1} \\ \vdots \\ \hat{v}_{kr} \end{bmatrix} = \underset{\{\tilde{c}_j^T\}j=1,\ldots,s}{\mathrm{argmax}} \frac{|\mathrm{trace}([V_{k1} \ldots V_{kr}]^H \tilde{c}_j^*)|}{\|[V_{k1} \ldots V_{kr}]\|_F},$$

so as to determine from the high rank adaptive codebook set the index of the high rank adaptive codebook matching the current channel, wherein $V_{k1} \ldots V_{kr}$ represents r eigenvectors of the short-term channel response, $\tilde{c}_j \in \{\tilde{c}_1, \ldots, \tilde{c}_S\}^{M \times r}$, S is a size of the codebook set, and $\tilde{c}_j$ the high rank adaptive codebook with M×r dimensions.

11. The method according to claim 8, wherein the high rank channel quantization is determined according to a maximum post-processing Signal-to-Noise Ratio (SINR) or channel capacity.

12. A method for processing channel information in a Multiple Input Multiple Output communication system, comprising:
   receiving information on a long-term channel correlation matrix and an index of a high rank adaptive codebook from a user equipment (UE);
   transforming different column vectors of a high rank baseline codebook corresponding to the index by different levels of the long-term channel correlation matrix to align to directions of different eigenvectors of the long-term channel correlation matrix; and
   using the transformed column vectors to construct a high rank adaptive codebook,
      wherein different column vectors in the baseline codebook are rotated by the different levels of the spatial correlation matrix, and
      wherein the channel correlation matrix is divided into levels according to its eigenvectors, and if a channel correlation matrix has a corresponding number of eigenvectors and eigenvalues, a covariance matrix related to an eigenvector of the largest eigenvalue is allocated the first level, and a covariance matrix related to an eigenvector of the second largest eigenvalue is allocated to the second level.

13. An apparatus for generating a high rank adaptive codebook in a Multiple Input Multiple Output communication system, comprising:
   an aligning component configured for transforming different column vectors in a high rank baseline codebook by different levels of a long-term channel correlation matrix to align to directions of different eigenvectors of the long-term channel correlation matrix; and
   a constructing component configured for using the transformed column vectors to construct a high rank adaptive codebook,
      wherein different column vectors in the baseline codebook are rotated by the different levels of the spatial correlation matrix, and
      wherein the channel correlation matrix is divided into levels according to its eigenvectors, and if a channel correlation matrix has a corresponding number of eigenvectors and eigenvalues, a covariance matrix related to an eigenvector of the largest eigenvalue is allocated the first level, and a covariance matrix related to an eigenvector of the second largest eigenvalue is allocated to the second level; and
   transmitting data from a transmitter by employing the high rank adaptive codebook.

14. An apparatus for feeding back channel information in a Multiple Input Multiple Output communication system, comprising:
   a constructing component configured for transforming different column vectors in a high rank baseline codebook by different levels of a long-term channel correlation matrix to align to directions of different eigenvectors of the long-term channel correlation matrix, thereby constructing a high rank adaptive codebook;
   a generating component configured for constituting a high rank adaptive codebook set on the basis of all high rank adaptive codebooks;
   a determining component configured for determining from the high rank adaptive codebook set an index of a high rank adaptive codebook matching a current channel; and
   a feedback component configured for feeding back information on the long-term channel correlation matrix and the index to a serving cell,
      wherein different column vectors in the baseline codebook are rotated by the different levels of the spatial correlation matrix, and
      wherein the channel correlation matrix is divided into levels according to its eigenvectors, and if a channel correlation matrix has a corresponding number of eigenvectors and eigenvalues, a covariance matrix related to an eigenvector of the largest eigenvalue is allocated the first level, and a covariance matrix related to an eigenvector of the second largest eigenvalue is allocated to the second level.

15. An apparatus for processing channel information in a Multiple Input Multiple Output communication system, comprising:
   a receiving component configured for receiving information on a long-term channel correlation matrix and an index of a high rank adaptive codebook from a user equipment (UE);
   an aligning component configured for transforming different column vectors of a high rank baseline codebook corresponding to the index by different levels of the long-term channel correlation matrix to align to directions of different eigenvectors of the long-term channel correlation matrix; and
   a constructing component configured for using the transformed column vectors to construct a high rank adaptive codebook,
      wherein different column vectors in the baseline codebook are rotated by the different levels of the spatial correlation matrix, and
      wherein the channel correlation matrix is divided into levels according to its eigenvectors, and if a channel correlation matrix has a corresponding number of eigenvectors and eigenvalues, a covariance matrix related to an eigenvector of the largest eigenvalue is allocated the first level, and a covariance matrix related to an eigenvector of the second largest eigenvalue is allocated to the second level;
   a transmitting component configured for transmitting data by employing the high rank adaptive codebook.

* * * * *